United States Patent [19]

Shaw

[11] 4,441,796

[45] * Apr. 10, 1984

[54] FILM SUPPORT ELEMENT ASSEMBLY

[75] Inventor: William C. Shaw, Streetsville, Canada

[73] Assignee: Imax Systems Corporation, Toronto, Canada

[*] Notice: The portion of the term of this patent subsequent to Dec. 28, 1999 has been disclaimed.

[21] Appl. No.: 407,524

[22] Filed: Aug. 12, 1982

Related U.S. Application Data

[63] Continuation-in-part of Ser. No. 290,630, Aug. 6, 1981, Pat. No. 4,365,877.

[51] Int. Cl.$^3$ .............................................. G03B 1/00
[52] U.S. Cl. .................................... 352/184; 350/582; 15/100; 15/214
[58] Field of Search .................. 352/184; 15/100, 214; 350/582

[56] References Cited

U.S. PATENT DOCUMENTS 2,967,119  1/1961  Gutterman ............................ 15/100
3,171,683  3/1965  Ludwig ................................ 350/582

FOREIGN PATENT DOCUMENTS 575868   4/1933  Fed. Rep. of Germany ........ 15/214
1057748  5/1959  Fed. Rep. of Germany ........ 15/214

Primary Examiner—Monroe H. Hayes
Attorney, Agent, or Firm—Rogers, Bereskin & Parr

[57] ABSTRACT

A film support element assembly is disclosed, primarily for supporting film in relation to a projection aperture in a motion picture projector having a rolling loop film transport mechanism. In a preferred embodiment the film support element is a so-called "field flattener" and has a cylindrically curved surface over which successive frames in the film are laid by the mechanism. Cleaning means are provided adjacent the film path and the lens element can be displaced to bring a fresh portion of the surface into the film path. At the same time, the cleaning means remove debris from the surface. In one embodiment the lens element is vibrated to discourage adhesion of debris.

13 Claims, 12 Drawing Figures

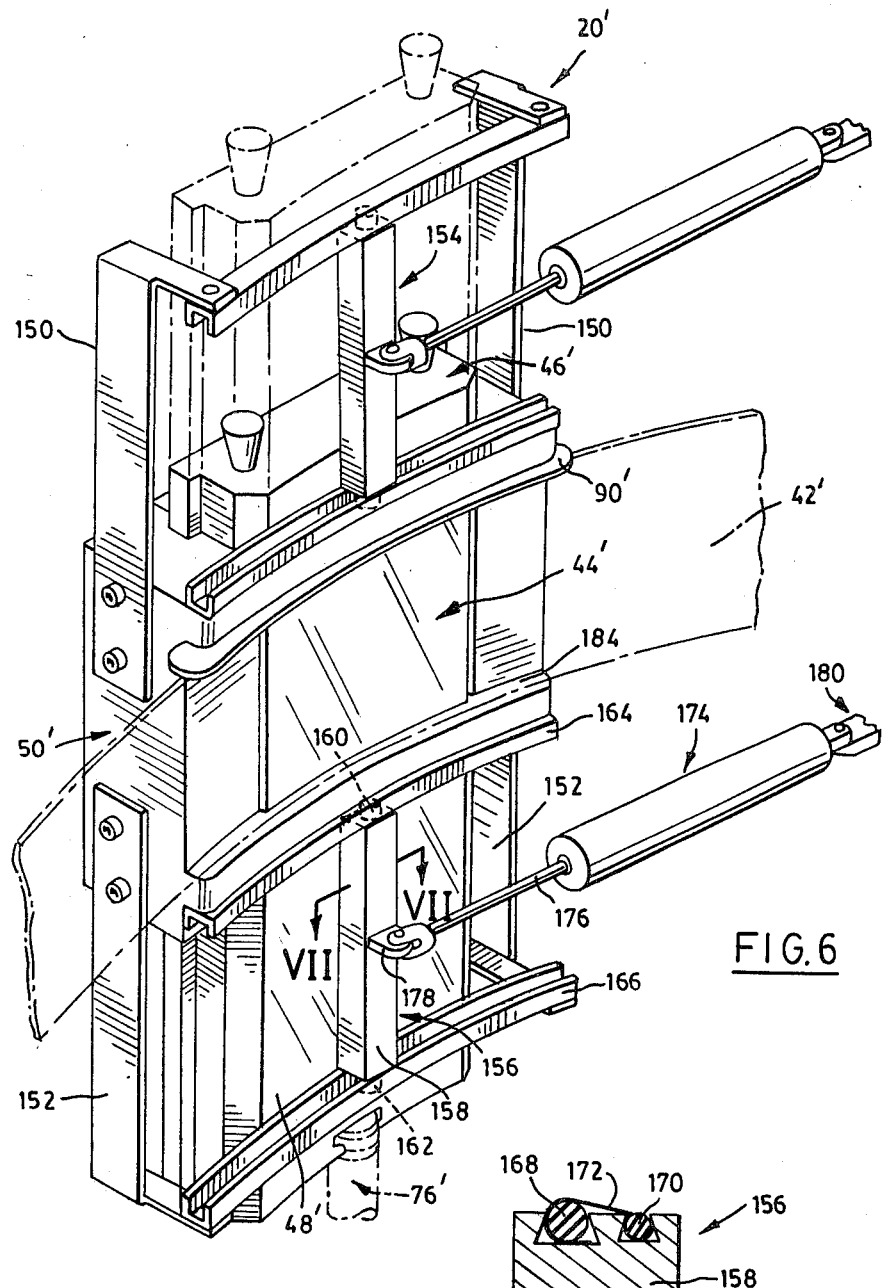

FILM SUPPORT ELEMENT ASSEMBLY

This is a continuation-in-part of Ser. No. 290,630 filed Aug. 6, 1981, now U.S. Pat. No. 4,365,877.

This invention relates generally to film projectors, cameras and the like having a film transport mechanism of the type which has become known as the "rolling loop" mechanism. More specifically, the invention is concerned with a film support element assembly by which film is supported in relation to an aperture (e.g. a projection aperture) in an apparatus of this general type.

U.S. Pat. No. 3,494,524 to Jones discloses the principle of a rolling loop film transport mechanism. The mechanism includes a curved stator and a rotor which cooperate to define a passage through which the film is transported. The rotor has gaps in which loops of film are continuously formed as the rotor rotates. Each loop is developed by feeding film from an input sprocket into one of the rotor gaps as the gap travels from a film inlet location to the aperture, and the loop decays progressively as the gap travels from the aperture to a driven output sprocket. The film is projected or exposed (as the case may be) at the position of the aperture and is held in that position on a registration pin or pins. A number of improvements in the original Jones mechanism are disclosed in U.S. Pat. No. 3,600,073 to Shaw.

In a rolling loop film transport mechanism, the film typically conforms to the curvature of the stator at the position of the projection or exposure aperture. U.S. Pat. No. 3,794,415 (also to Jones) does disclose a proposal for permitting the film to adopt a flat configuration during projection but, at least in commercial projectors, it has been found preferable to allow the film to conform to the curvature of the stator at the position of the projection aperture. A lens element known as a "field flattener" supports the film at this position and has a cylindrically curved surface across which the film is laid; the curvature of this surface in combination with other lens elements compensates for the curvature of the film and provides for proper projection of the image.

Normal practice is to position the field flattener in an opening in the stator so that the film frames are successively laid onto the cylindrical surface of the field flattener as the film moves through the projector. A problem with this arrangement is that particles of dust, film emulsion and other debris carried with the film tend to accumulate on the cylindrical surface of the field flattener element. The projection lens of the projector will be focused on the film immediately adjacent to that cylindrical surface so that particles on the surface will be almost in focus.

It has therefore been proposed to provide interchangeable field flattener elements so that a "dirty" element can be replaced with a clean element. In the projector disclosed in the Shaw patent disclosed above, the field flattener lens element is slideably received in a pair of vertical guides. The element is located against downward movement by a latch which can be released by a button at the top of the lens element holder positioned so that the latch is automatically released when a clean lens element is placed in the guides and moved downwardly. The "dirty" element is ejected downwardly from the guides and the clean element moves into its place. It has also been proposed to provide a wiper above the film path for wiping the cylindrical surface of the replacement lens element as it moves into place.

The arrangement disclosed in the Shaw patent has been found to operate very satisfactorily in practice while the projector is running, with a barely perceptible effect on the projected image. Nevertheless, to the practiced eye, it is possible to detect a black bar moving across the projected image when the lens elements are changed.

An object of the present invention is to provide improvements in rolling loop projectors, cameras and like apparatus which are aimed at avoiding this problem.

According to one aspect of the invention there is provided a projector, camera and like apparatus having a rolling loop film transport mechanism wherein a lens element is provided and has a film support surface across which successive portions of a film can be laid during transportation of the film in a film transport path which includes an aperture, and wherein the projector further includes cleaning means adapted to remove debris from said film support surface.

In one embodiment, means is provided supporting the lens element for movement in a direction generally normal to said film transport path between first and second positions in which respectively different portions of the film support surface are disposed in said path and the film support surface of the lens element is continuous and of uniform cross-sectional shape and has a length sufficiently in excess of twice the width of the film that movement of the lens element between its first and second positions will cause a portion of the film support surface in said path to move to a position adjacent to and clear thereof. The cleaning means is then adapted to remove debris from a said portion of the film support surface which has been moved out of the film transport path.

In an alternative embodiment of the invention, the cleaning means may take the form of means coupled to the lens element and adapted to vibrate the element generally in a direction which is substantially parallel to a plane in which the film is disposed at said aperture. Such vibration has been found to discourage adhesion of debris to said film support surface.

In one embodiment in which a displaceable lens element is employed, first and second wiper elements extend transversely of and in contact with the film support surface on respectively opposite sides of the film path. The wiper elements are adapted to wipe the surface and trap debris upon movement of the lens element relative to the wiper elements. The wiper elements are removable for disposal of trapped debris. The length of the film support surface of the lens element is preferably such that movement of the lens element between its first and second positions will cause the relevant wiper element to traverse the entire axial extent of the portion of the film support surface moving out of the film path.

In practice, it has been found preferable for the length of the film support surface of the lens element to approximate two and a half times the width of the film. Provided the wiper elements are disposed fairly close to the film path, debris accumulated on the curved surface adjacent to but inwardly of one of the wipers will be removed by the other wiper when the lens element is moved to bring a fresh portion of its film support surface into the film path. Guiding surfaces for the top and bottom edges of the film are preferably provided on the lens element support means so that the film path is always accurately defined with respect to the axial direction of the lens element. However, such surfaces could alternatively be provided in the projector or other apparatus in which the lens element assembly is used.

In any event, the lens element may be a field flattener having a cylindrically curved film support surface.

In order that the invention may be more clearly understood, reference will now be made to the accompanying drawings which illustrate a number of preferred embodiments of the invention by way of example, and in which:

FIGS. 6, 8 and 10 are views somewhat similar to FIG. 2 but illustrating three alternative forms of cleaning means which may be employed in a film support element assembly of the form provided by the invention;

FIG. 7 is a detail sectional view on line VII—VII of FIG. 6;

Figure 1:
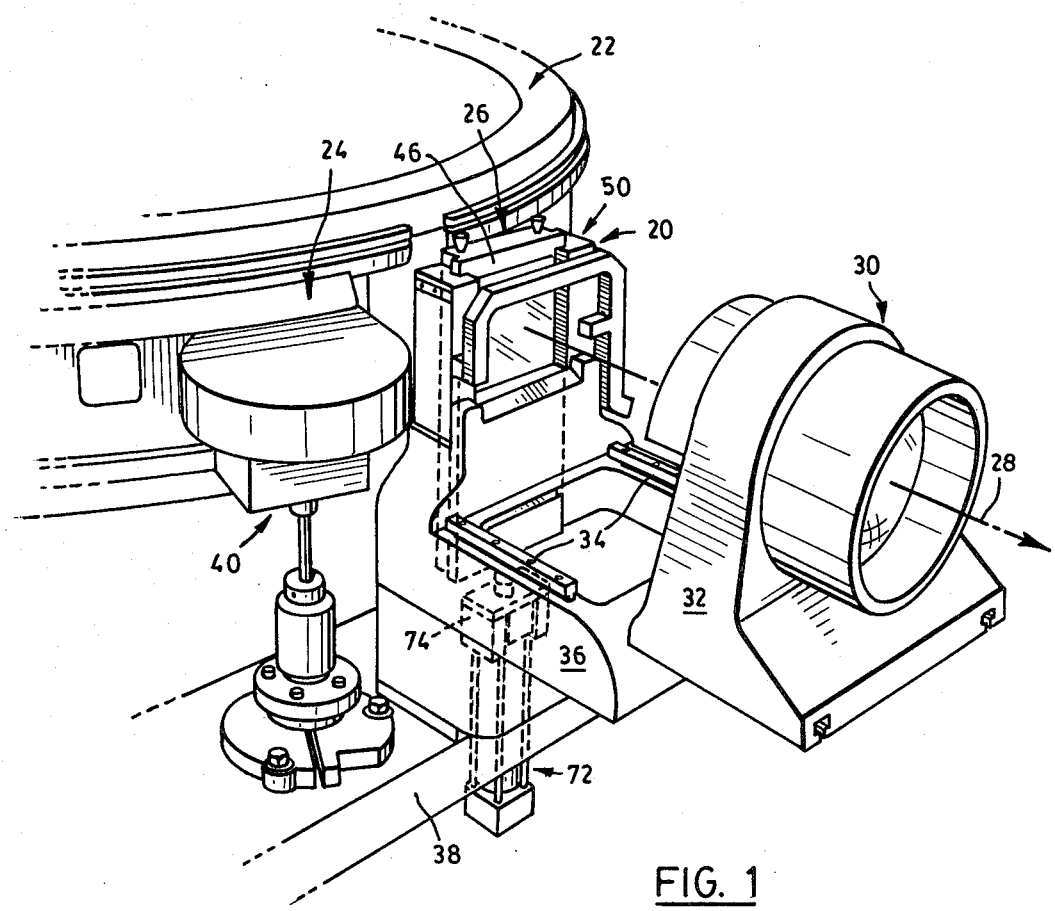
FIG. 1 is a perspective view, partly exploded, of part of a motion picture projector of the general form disclosed in the Shaw patent referred to above, but incorporating a film support element assembly of the present invention having a "field flattener" lens element.
Figure 2:
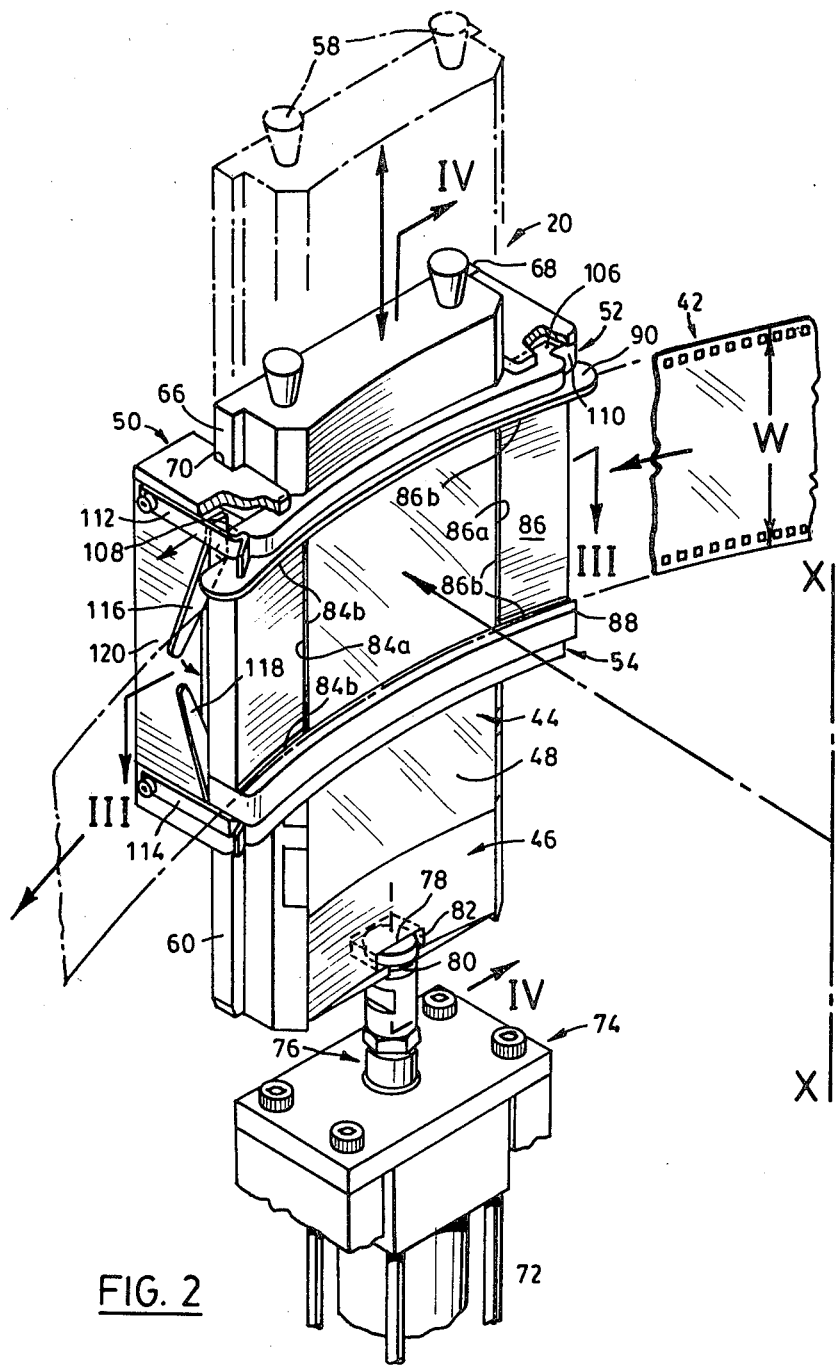
FIG. 2 is a perspective view of the assembly of FIG. 1 but taken from the opposite side as compared with FIG. 1 and with associated structure omitted.

Referring first to FIG. 1, the film support element assembly provided by the invention is generally indicated by reference numeral 20 but is partly concealed by associated structure forming part of the projector proper; assembly 20 is better shown in FIG. 2. However, before referring to that view, it may be convenient to briefly describe the principal components of the projector shown in FIG. 1.

Reference may be made to the Shaw U.S. Pat. No. 3,600,073 for a complete description of the rolling loop film transport mechanism of the projector. For present purposes, it is sufficient to note that the projector includes a cylindrical rotor, part of which is visible at 22 in FIG. 1 and a stator, part of which is indicated at 24. These two components together define a film passage along which the film is transported by forming successive rolling loops in the film as described in the patent. Successive frames in the film are transported by the rolling loop mechanism to a projection aperture in the stator at the location indicated at 26 in FIG. 1. The film is not in fact visible in that view but can be seen in FIG. 2 (see later).

The projector includes a projection lamp and mirror arrangement by which light is projected through the projection aperture in the direction indicated by arrow 28. The light passes successively through the film, through the lens element assembly 20 and then through a projection lens assembly 30 by which the image on the film is focussed onto a screen. Assembly 30 includes a lens mount 32 which is shown partly exploded from the remainder of the projector in FIG. 1 and which is in fact received in guideways 34 in a lens mount saddle 36 so that the projection lens assembly can be adjusted back and forth for focusing purposes. Details of the adjustment mechanism have not been shown since they form no part of the present invention.

Lens mount saddle 36 is secured to the frame of the projector, part of which is indicated at 38, and is itself shaped to provide a housing for the field flattener lens element assembly 20 and to support that assembly adjacent to stator 24. Also shown mounted on frame 38 is a cam unit 40, the purpose of which is to decelerate the moving film in the region of the projection aperture 26 so that the film is arrested and held stationary in the vicinity of the projection aperture 26 for projection of each frame. Cam unit 40 is essentially the same as the corresponding unit described and illustrated in the Shaw patent and will not therefore be described in detail.

Referring now to FIG. 2, the film support element assembly is shown as it would be seen from the side which is closest to the stator in the assembled projector; that is, the opposite side as compared with FIG. 1. A length of film is indicated partly in ghost outline at 42 in FIG. 2 and is shown generally in the path the film would normally adopt during transportation past assembly 20, although it should be noted that loops such as would normally be formed in the film during transportation have not been shown.

Assembly 20 includes an elongate field flattener lens element 44 supported in a housing or body 46. Element 44 has a cylindrically curved surface 48 which extends about an imaginary axis represented at X—X in FIG. 2. In fact, axis X—X corresponds to the rotational axis of the rotor 22 and the axis of the stator 24 so that the curvature of surface 48 corresponds to the curvature of the film passage defined between the rotor and the stator. Film 42 is transported in a path extending generally transversely with respect to axis X—X and successive portions of the film are laid across surface 48 during such transportation as described in the Shaw patent.

Element 44 is supported for movement in the direction of axis X—X between first and second positions in which respectively different portions of its curved surface 48 are disposed in the film path. This support is provided by the lens element housing 46 and by a so-called aperture block 50 in which the housing is slidably mounted. Housing 46 is shown in a lower position in full lines in which an upper portion of the curved surface 48 is in the film path, and in ghost outline in an upper position, in which a lower portion of surface 48 would be behind the film.

Wiper elements generally indicated at 52 and 54 are provided respectively above and below the film path and are supported by the aperture block 50. The elements are shown in more detail in FIGS. 4 and 5 (to be described) and are disposed in contact with the lens element surface 48 so as to wipe the surface and trap debris which has accumulated thereon, upon movement of the lens element relative to the wiper elements. The lens elements are removable for the disposal of trapped debris as will be more particularly described later.

The cylindrically curved surface 48 of the lens element is continuous and is of uniform cross-sectional shape throughout its length so that up and down movement of the element has no effect whatever on the image being projected by the projector. In this particular embodiment, the axial length of surface 48 is approximately two and a half times the width W of film 42.

This ensures that the entire axial extent of the portion of surface 48 which is moving out of the film path (the "dirty" portion) is wiped by the relevant wiper element. Thus, the axial length of element 44 should be sufficient to ensure that this occurs otherwise debris remaining on that portion of the lens element would be transferred back into the path of the film the next time the lens element were moved in the opposite direction.

In this embodiment, the field flattener lens element is formed in one piece and is made of fused silica optical grade No. 1 quartz. In an alternative embodiment, the element could be made in sections cemented together so as to form the continuous cylindrical surface 48.

Figure 4:
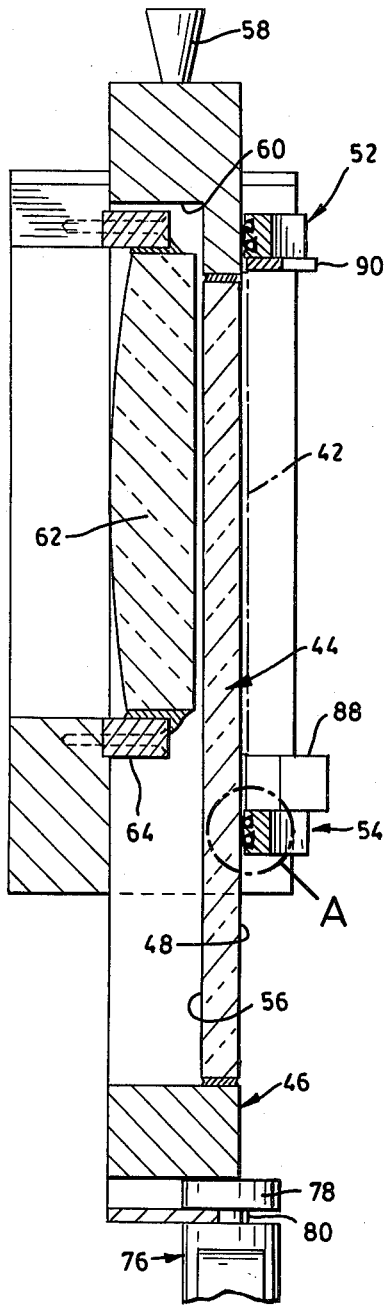
FIG. 4 is a vertical sectional view on line IV—IV of FIG. 2.

FIG. 4 shows the lens element assembly in vertical section and it will be seen that element 44 is relatively thin and has a flat inner surface 56. The element is cemented in a suitably shaped opening in its housing 46 and the front surface of the housing is shaped to correspond with the curvature of element surface 48 (see FIG. 2). Two knobs 58 protrude from the top of housing 46 for facilitating handling of the lens element, e.g. during its assembly into block 50.

Referring back to FIG. 4, it will be seen that housing 46 defines a recess 60 behind the lens element. This recess receives a spherical lens element 62 which cooperates with element 44 during projection of the film to provide the optical characteristics required in the projector. Element 62 is stationary and does not move with lens element 44. Recess 60 therefore extends over the full length of element 44 so that the spherical element can be accommodated in any axial position of element 44. Element 62 is rectangular in shape and is cemented into a suitable lens mount 64 which is bolted to a part of aperture block 50 behind the cylindrical lens housing 46 as seen in FIG. 2.

Referring back to FIG. 2, it will be seen that housing 46 is shaped to define longitudinal ribs 66 and 68, one on each side which form guides received in complimentary guideways, one of which is indicated at 70, for permitting vertical sliding movement of housing 46 with respect to aperture block 50.

In the illustrated embodiment, an air cylinder 72 is provided for effecting vertical sliding movement of housing 46 although it will of course be understood that this is optional. In an alternative embodiment, manual operation could be employed. In any event, air cylinder 72 is supported by suitable brackets generally indicated at 74 secured to the frame of the projector below the lens mount saddle 36 (see FIG. 1). The air cylinder has a piston rod 76 which protrudes from the top bracket 74 (see FIG. 2) and which is provided at its outer end with a fitment including a head 78 having a depending neck 80. The fitment is received in a suitably dimensioned T-shaped slot 82 adjacent the lower end of housing 46. Slot 82 is open at both sides so that the holder can be detached from the piston at appropriate times. The stroke of cylinder 72 is selected to provide for movement of lens element 44 substantially between its extreme end positions. A suitable pneumatic supply and control will of course be provided for air cylinder 72. Typically, a manual control arrangement will be provided so that the projector operator can simply move the lens element when he notices that the projected image is being affected by debris.

Figure 5:
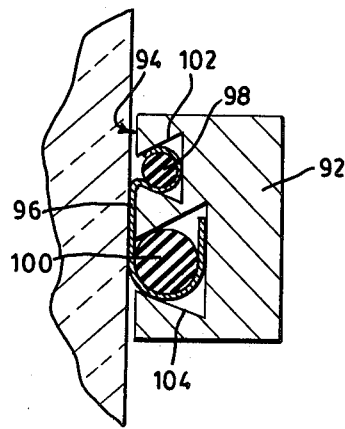
FIG. 5 is a detail view of the part of FIG. 4 indicated at A.

Aperture block 50 is an assembly of individual components and substantially completely encloses the lens element 44 and its housing 46 except for a front portion between the wiper elements 52 and 54 where the curved surface of element 44 is exposed. On opposite sides of this surface are portions 84 and 86 of the aperture block which are recessed as indicated at 84a and 86a respectively to leave lands 84$^b$ and 86$^b$ against which marginal areas of the film frames are supported during film transportation. Lands 84$^b$ and 86b are hard chromed. Below portions 84, 86 is a ledge or shoulder 88 which forms a guiding surface for the bottom edge of the film. A corresponding plate 90 extends parallel to shoulder 88 and forms a guiding surface for the upper edge of the film. The wiper elements 52 and 54 are disposed adjacent to and outwardly of these respective surfaces. The wiper elements are shown in section in FIG. 4 and are essentially the same as one another. FIG. 5 is an enlarged sectional view of element 54 and it will be seen that the element includes an elongate housing 92 having an inner surface 94 which is curved in conformity with the curvature of the curved surface of lens element 44. Extending across part of surface 94 is a section 96 of absorbant material selected to remove and retain particles of film emulsion and other debris. Specifically, the material may be 3M film cleaning tissue. The material is held in place by two resilient strips 98 and 100 pressed into respective recesses 102 and 104 which open into surface 94 and by which the material is trapped. The recesses extend over the entire length of housing 92 and are undercut so that the strips 100 and 102 have to be distorted in moving into and out of the respective recesses. The recesses are spaced in the direction of movement of the lens element 44 so as to resist accidental dislodgement of the cleaning material during movement of the lens element. At the same time, the cleaning material can be readily removed by prying the strips from the recesses using a suitable tool. The material will then be discarded and replaced by fresh material. In assembling the wiper element, the strips 98, 100 are in fact installed so that strip 100 holds the cleaning material slightly clear of surface 94 so that the material is resiliently supported.

The wiper elements themselves are of course removable from aperture block 50 for this purpose. Referring back to FIG. 2, it will be seen that the elements are received in respective recesses in block 50 and normally retained by releaseable spring clips. Thus, referring to the upper wiper element by way of example, it will be seen that the element is shaped to define respective recesses 106 and 108 adjacent its ends. One of these recesses receives a fixed projection 110 on aperture block 50 while the other recess receives a detent formed adjacent the outer end of a leaf-spring 112 secured to the aperture block. A corresponding spring for the lower wiper element is denoted 114. The springs can each be deflected outwardly by respective release levers 116 and 118, each of which is pivoted in a slot in block 50 so that, by depressing the lever (as indicated by arrow 120 in the case of lever 116), the opposite end of the lever will pivot outwardly and release the associated leaf-spring. The wiper element can then of course be removed, its cleaning tissue replaced and the wiper element simply snap-fitted back into aperture block 50.

Reference will now be made to FIGS. 6 to 12 in describing other forms of cleaning means which may be employed in a film support element assembly provided by the invention. In the embodiment of FIGS. 6 to 10 inclusive, cleaning means in the form of wiper elements are employed while in FIGS. 11 and 12 the cleaning means take the form of means for vibrating the element. In all of these views, primed reference numerals have been used to denote parts which correspond with parts shown in FIGS. 1 to 5.

In FIGS. 6 and 7, wiper elements are shown which are movable transversely with respect to the direction of movement of the film support element (i.e. parallel to the direction of film movement). The element and its housing are essentially of the same form as those shown in FIGS. 1 to 5 and are denoted respectively by reference numerals 44' and 46'. Housing 46' is movable between first and second positions in an aperture block denoted 50' under the control of an air cylinder, the piston rod of which is shown at 76'.

Aperture block 50' is somewhat different from the aperture block shown in the previous embodiment in that it includes upper and lower brackets generally indicated at 150 and 152 respectively which support tracks for guiding respective wiper elements 154 and 156 for movement transversely of the lens 44'. The two wiper elements and associated structure are essentially the same and for convience of description, only the lower wiper element and associated structure will be described in detail.

The element itself takes the form of a bar 158 which is disposed generally longitudinally of the surface of lens element 44' and which has cylindrical projections 160 and 162 from its upper and lower ends which are received in respective tracks 164 and 166. The tracks are carried by the brackets 152. FIG. 7 is a sectional view through bar 158 and it will be seen that the structure of the wiper element is essentially very similar to the structure of the wiper element of the previous embodiment as best shown in FIG. 5. Thus, bar 158 forms a housing for two resilient sealing strips 168 and 170 which are disposed in recesses opening into the inner face of the housing. The sealing strips retain a section 172 of lens cleaning tissue. The wiper element is disposed so that sealing strip 168 is partially compressed in use so that the cleaning material is resiliently urged against the surface of the lens element. The tracks 164 and 166 are curved to conform with the curvature of the lens element surface so that the cleaning material 172 is maintained in contact with the surface throughout its movement.

A double acting air cylinder 174 is employed to actuate the wiper element 156. A piston 176 projects from one end of the air cylinder and is fitted with a yoke which is pivotally coupled to a bracket 178 on bar 158. At its opposite end, the cylinder is pivotally mounted to a bracket 180 fixed to a stationary part of the projector. The stroke of air cylinder 176 is selected to ensure wiping of the whole width of lens element 44' and to permit retraction of the wiper element to a rest position clear of the lens element.

Air cylinder 174 and the companion cylinder coupled to wiper element 154 are operated selectively when the lens element has been moved to bring a portion of its surface on which debris has accumulated out of the film path. Normally, the relevant wiper element will be moved from its rest position and back at least once. Selective operation of the respective air cylinders may be accomplished under manual control or automatically in timed relation with operation of the air cylinder 72 by which the lens element is displaced.

In FIG. 6, a section of the film is indicated at 42' in ghost outline and it will be seen that the film is guided between an upper plate 90' and a lower shoulder 184 on aperture block 50' generally in the same manner as described in connection with the preceding embodiment except in that the plate 90 of FIG. 2 has in effect been replaced by shoulder 182 in FIG. 6.

Figure 8:
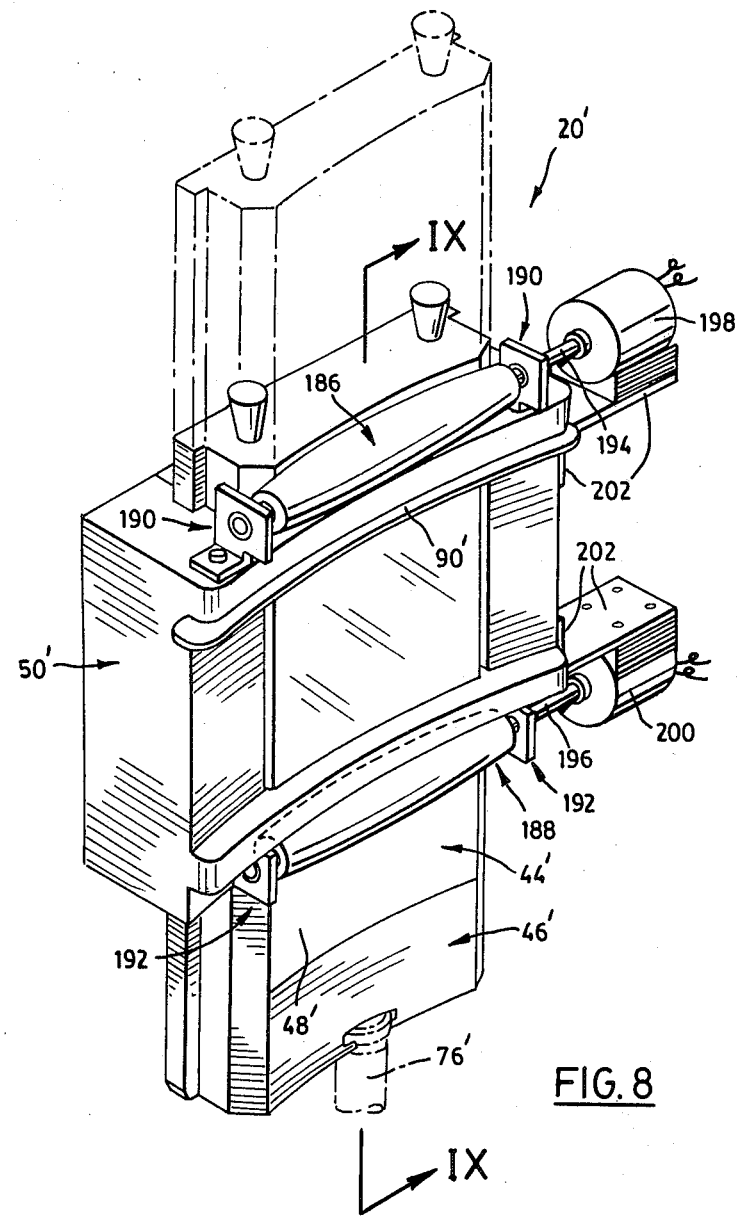
Figure 9:
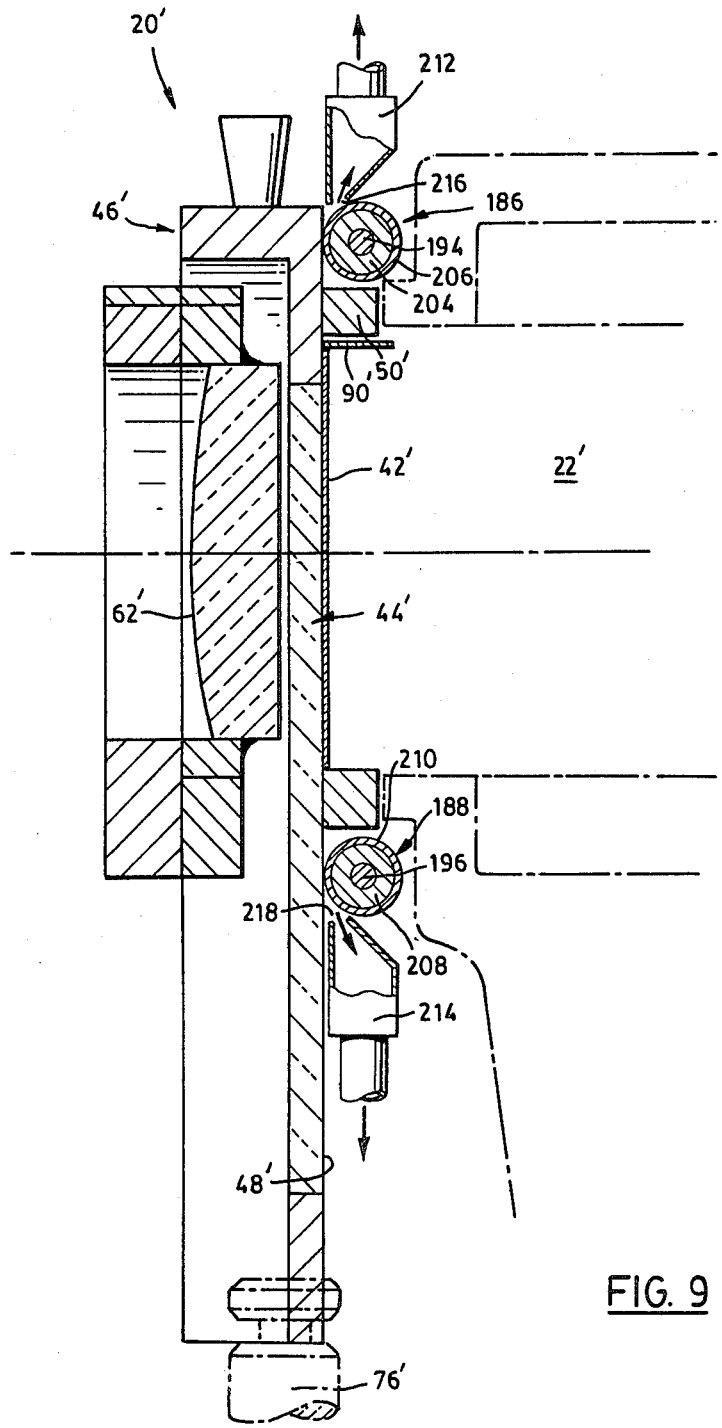
FIG. 9 is a longitudinal sectional view on line IX—IX of FIG. 8.

Referring now to FIGS. 8 and 9, in this embodiment, the wiper elements take the form of rollers 186 and 188 disposed respectively above and below the film path and arranged to wipe the curved surface of the lens element as it moves between its first and second positions. The rollers are mounted to turn in respective brackets generally denoted 190 and 192 and mounted on the aperture block 50'. The block itself is essentially the same as the block as shown in FIG. 6 with the exception that the brackets 150 and 152 have been omitted. The lens element 44' and its housing 46' are also essentially the same as in the preceding embodiments.

It will be noted that each of the rollers 186 and 188 is of a length slightly greater than the width of lens element 44' and is barrel-shaped with a profile corresponding generally to the curvature of the curved surface of the lens element. The rollers include respective shafts 194 and 196 which are rotatably mounted in the brackets 190 and 192 and which extend generally normal to the direction in which the lens element is displaced in moving between its first and second positions. Each shaft is coupled to a respective electric motor 198 and 200 carried by brackets 202 secured to the aperture block 50'.

The rollers are shown in section in FIG. 9 and it will be seen that each roller is of composite construction and includes a body which is mounted on the roller shaft and which is itself surrounded by a cover. In the case of roller 186, the body is denoted 204 and the cover 206 while in the case of the other roller the body is indicated at 208 and the cover 210. The bodies 204 and 208 are resilient and are typically made of rubber bonded to the respective shafts. The covers 206 and 210 are sections of lens cleaning paper adhesively secured to the respective roller bodies. Preferably, the paper is replaceable. In an alternative embodiment, the covers 206 and 210 may be made of a material which is "tacky" and to which particles of debris on the lens element will adhere. In this case, it may be sufficient to allow the rollers to rotate freely in contact with the lens element rather than providing external drive means (the motors 198 and 200) as in the illustrated embodiment. In that case, the rollers would be rotated upon longitudinal movement of the lens element by virtue of the friction between the rollers and the element. In the illustrated embodiment, however, this is accomplished by the motors 198 and 200. Where motors are provided, they preferably incorporate suitable gearing arranged to cause the rollers to rotate at relatively slow speeds. Normally, the rollers will rotate only when the lens element is displaced and preferably the rollers will be separately actuated so that only that roller which is actually performing a cleaning function will rotate at any given time. Control of the motors may of course be effected manually or by suitable automatic control means.

FIG. 9 also illustrates a further optional feature of the invention in which suction means are provided in association with each of the rollers to remove and convey to a remote location (not shown) debris dislodged from the surface of the lens element. Suction means may also be used in association with the wiper elements disclosed in other embodiments but may be particularly useful where roller form wiper elements are used. Thus, referring to FIG. 9, respective suction manifolds 212 and 214 are provided adjacent to but outwardly of the rollers 194 and 196. The manifolds extend generally parallel to and over substantially the entire length of each roller and each manifold has an intake slot 216 and 218 respectively disposed adjacent the line of contact between the associated roller and the lens element surface. The rollers are arranged to rotate in opposite directions so that any debris dislodged from the lens element but not captured by the roller will be thrown away from the film path and into the intake slot of the associated manifold. The manifolds will be mounted on suitable stationary supports (not shown) mounted on fixed parts of the projector and will be coupled to a suitable source of suction which is preferably incorporated in the pneumatic system normally provided on the projector.

Figure 10:
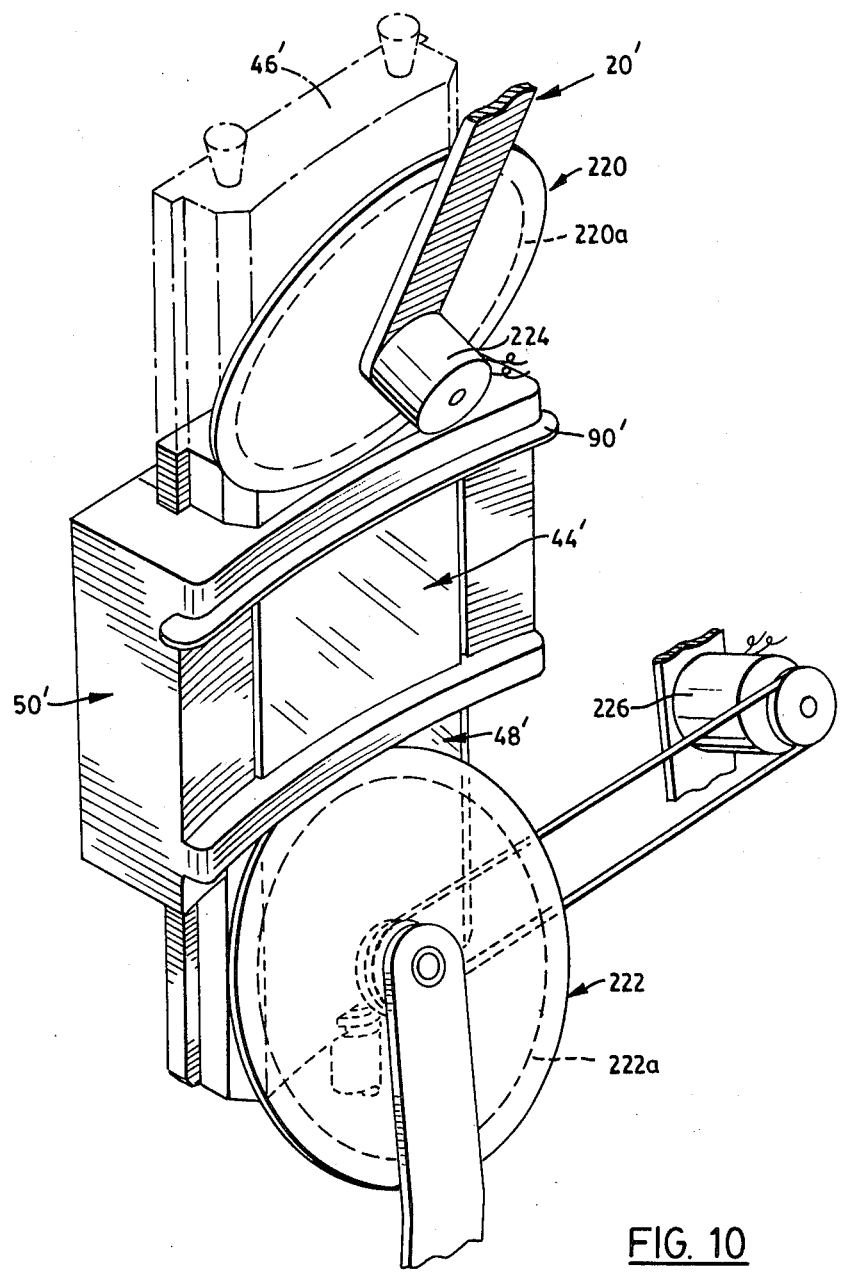

FIG. 10 illustrates an embodiment of the invention in which disc-form wiper elements are employed. In the illustrated embodiment, two discs denoted respectively 220 and 222 are provided above and below the film path and are disposed in respective planes which are inclined outwardly away from the aperture block 50' at relatively shallow angles to the curved surface of the lens element so that marginal portions of the respective discs are applied to the lens element and describe arcuate cleaning paths across the surface of the lens element outwardly of but adjacent to the aperture block 50'. The angle at which the discs are inclined to the lens element will depend the curvature of the lens element surface and on the diameter of the disc but in a typical example an angle of the order of 15° may be appropriate for a five inch disc. The marginal portions of the disc are flexible with respect to the remainder of the disc and lie substantially on the curved surface of the lens element. The discs are made of a suitable plastic material and the marginal portions which contact the lens element are covered with a lens cleaning material. In this particular embodiment, lens cleaning paper is employed and is secured to the remainder of the disc by double-sided tape. This material is indicated in dotted outline at 220a in the case of disc 220 and at 222a in the case of disc 222.

The discs are rotatable about their respective centers of rotation by respective electric drive motors denoted 224 and 226 in FIG. 10. Motor 224 drives disc 220 directly and is supported by a bracket 228 coupled to a stationary part of a projector. Due to space limitations in the projector, motor 226 is located in a laterally spaced position away from disc 222 and drives the disc through a belt and pulley arrangement. In both cases, the motors are provided with gearing arranged to turn the discs at relatively low speeds and as in the preceding embodiment, the motors are preferably separately controlled either manually or by suitable automatic control means.

Figure 11:
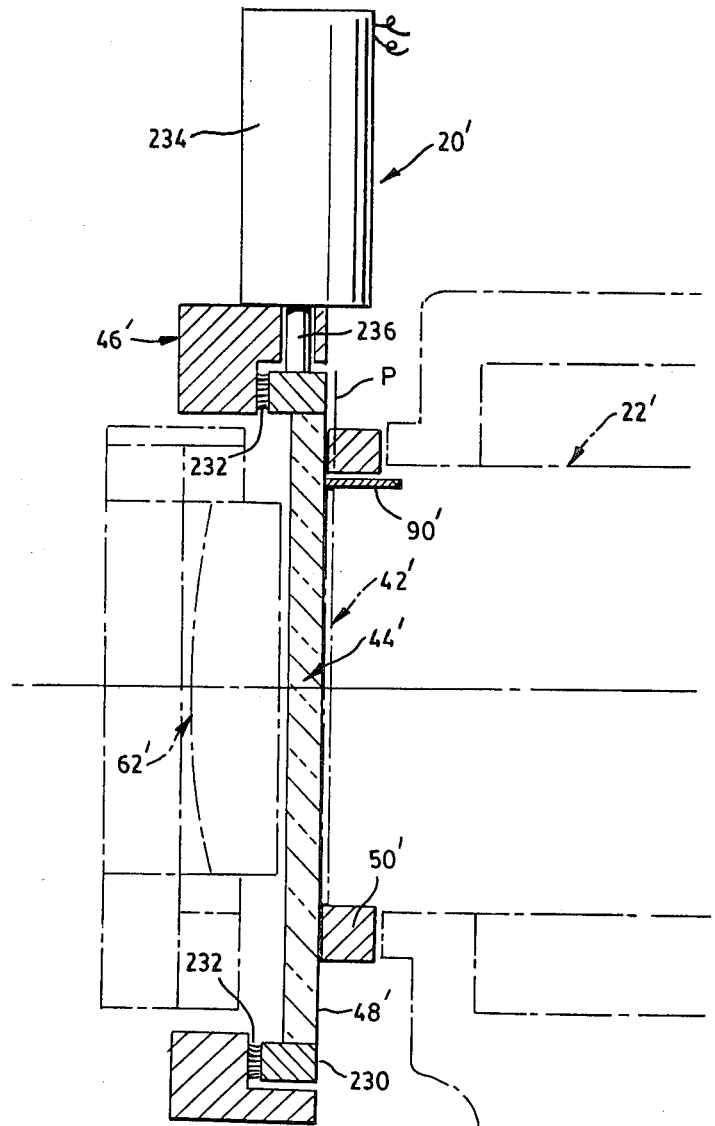
FIGS. 11 and 12 are longitudinal sectional views somewhat similar to FIG. 9 but showing, respectively, two further embodiments of the invention in which means is provided for vibrating the lens element.
Figure 12:
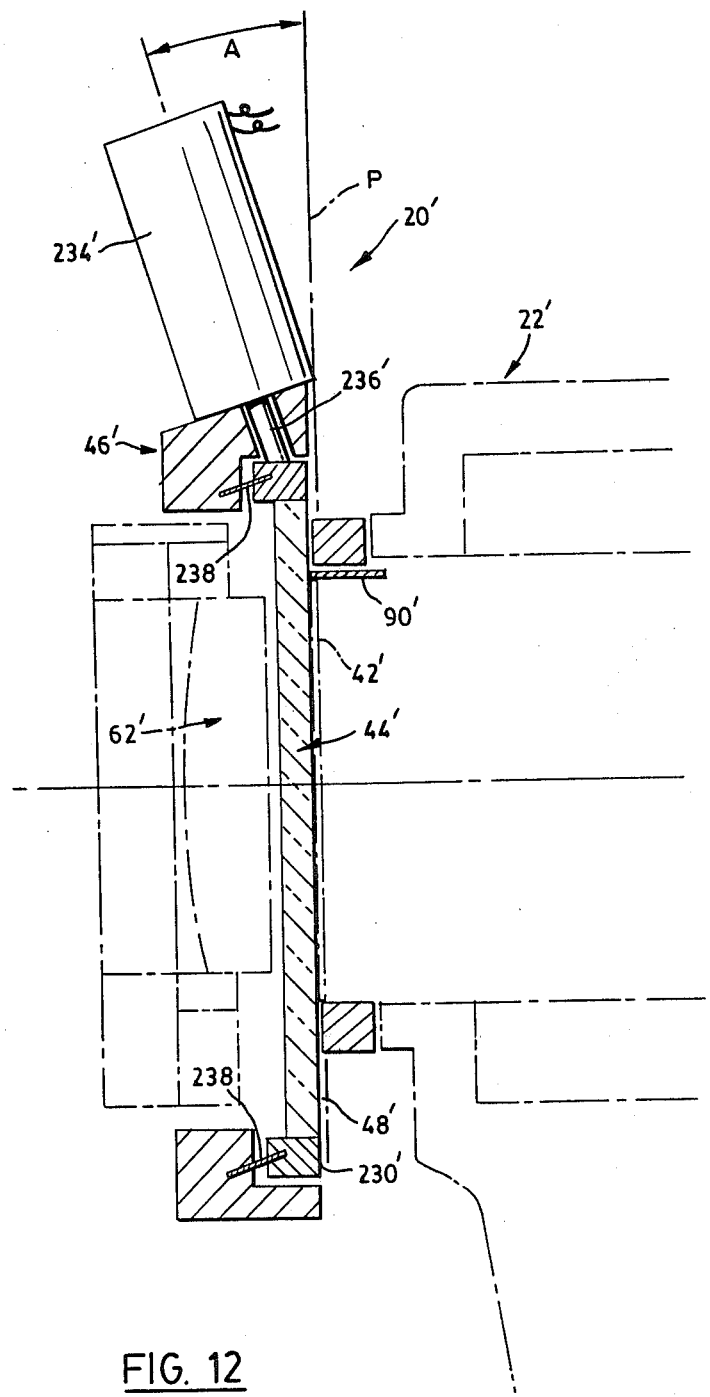

Reference will now be made to FIGS. 11 and 12 in describing alternative embodiments of the invention in which vibratory lens element cleaning means are employed.

In FIG. 11, the lens element is shown at 44' and its holder at 46' although both of these components are somewhat different from the lens element and holder disclosed in the previous embodiments. Thus, in this embodiment, the lens element 44' is held in a peripheral frame 230 secured by rubber mountings 232 in holder 46'. The mountings allow the lens element and frame to vibrate but in this embodiment, the holder 46' remains stationary. The aperture block 50' takes the form of a simple frame disposed between the lens element and the rotor of the projector (which is indicated in ghost outline at 22'). The spherical lens element of the projector optical system is indicated in ghost outline at 62'.

A vibration transducer 234 is mounted on top of the lens element holder 46' and has an actuating shaft 236 which is coupled to the lens element frame 230. When the transducer 234 is operated, its shaft 236 vibrates axially over a relatively short amplitude but at relatively high frequency so as to cause a corresponding vibration of the lens element 44' in a direction generally parallel to the plane containing the film. That plane is indicated in ghost outline at P in FIG. 11 and the film is denoted 42'

Typically, the amplitude of oscillation of the lens element will be less than about ten thousandths of an inch and preferably less than one thousandth. The frequency of oscillation may be in the range 500 to 20,000 Hz. Where a frequency towards the upper end of this range is employed, transducer 234 may be a piezo-electric crystal transducer, while the frequencies towards the lower end of this range an electromechanical transducer may be employed.

The mountings 232 should preferably not unduly impede the vibration of the lens element and may take the form of pads of rubber or other resilient material bonded between the housing 46' and the frame 230. The pads may be disposed at the corners of frame 230 or may take the form of strips extending along opposed sides of the frame.

FIG. 12 shows an embodiment which is somewhat similar to the embodiment of FIG. 11 but in which the vibration transducer is set at an inclination to the plane containing the film so that the vibratory motion imparted to the lens element includes a component acting laterally of that plane. In FIG. 12, the lens element 44' is shown mounted on a frame 230' so as to be movable with respect to a housing 46'. The vibration tranducer 234' is mounted on housing 46' so that the axis along which its actuating member 236' acts is disposed at an inclination represented by the angle denoted A to the plane P containing film. Frame 230' is coupled to housing 46' by flexible spring webs 238 which are also inclined to plane P so as to allow the lens element 44' to move in a direction which includes a primary component parallel to plane P but which also includes a component laterally of that plane.

Angle A may vary but should not be so great as to cause vibration of the lens element to displace the film laterially of plane P to an extent sufficient to materially affect the focus of the film. However, it is believed that a component of lateral movement may be helpful in keeping the lens element clean.

The amplitude and frequency of vibration and the particular structure of the vibration transducer 234' may be the same as described previously in connection with FIG. 11.

It is believed that the embodiments of FIGS. 11 and 12 may be particularly useful in that vibration of the lens element may tend not only to remove accumulate debris from the surface of the element but will also discourage adherence of particles of emulsion, dust and other debris to the surface of the element.

Figure 3:
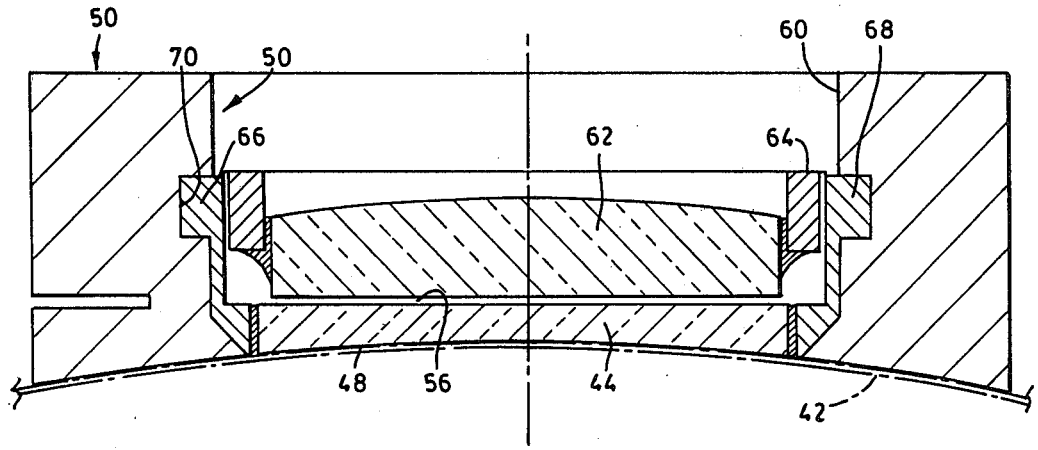
FIG. 3 is a planar horizontal sectional view on line III—III of FIG. 2.

It will of course be appreciated that the embodiments described above are given by way of example only and that many modifications are possible in addition to those specifically mentioned. For example, the field flattener lens element could be arranged to be manually displaceable as discussed above. Where a spherical lens element is required in association with the field flattener lens element, the particular arrangement described can be varied. The spherical lens element could be completely separate from the field flattener lens element assembly. In the embodiment of FIGS. 1 to 3, the leaf springs 112, 114 could of course be replaced by spring-loaded latches.

Another possible modification would be to provide means for vibrating the lens element (such as those disclosed with reference to FIGS. 11 and 12) in combination with other forms of cleaning means (e.g. wipers). In any embodiment in which vibrating means are employed, flexible mountings other than the rubber pads or springs specifically disclosed above may be used.

It will also be appreciated that while the invention has been described primarily in connection with a projector of the general type disclosed in the Shaw patent referred to above, there is no limitation in this respect. Where a field flattener lens element is required in some other form of rolling loop type of projector or in a camera or other similar apparatus, the assembly provided by the invention may also be used. Such an assembly will normally be used in a motion picture film apparatus although within the broad scope of the invention, the assembly could be used with a still camera or projector. Further, it should be noted that the assembly provided by the invention may find application in an environment in which the film lies flat during exposure or projection (as the case may be). For example, as disclosed in U.S. Pat. No. 3,794,415 (Jones). In that case, the lens element of the assembly would have a generally flat outer face for supporting the film and would not in fact act as a field flattener.

It is also to be noted that cleaning means other than the specific examples described above may be employed. Jets of cleaning fluid (e.g. air or a suitable liquid) may be employed as a cleaning means either alone or in combination with other cleaning means. In some cases, cleaning means need be provided at one side of the film path only.

I claim:

1. A projector, camera or like apparatus having a rolling loop film transport mechanism including a stator and a rotor adapted to co-operate to form continuous rolling loops in said film and to cause transportation thereof through the apparatus along a film path which includes an aperture;

wherein the improvement comprises:

a film support element assembly disposed at the position of said aperture and comprising: an elongate lens element having a film support surface across which successive portions of a film of known width can be laid during transportation of said film in said film transport path; means supporting said lens element for movement in a direction generally normal to said path between first and second positions in which respectively different portions of said film support surface are disposed in said path; said film support surface of the lens element being continuous and of uniform cross-sectional shape and having a length sufficiently in excess of twice the width of the film that said movement of the lens element between its first and second positions will cause a portion of said film support surface in said path to move to a position adjacent to and clear of said path; and cleaning means adapted to remove debris from a said portion of said film support surface which has been moved out of said path.

2. An apparatus as claimed in claim 1, wherein first and second cleaning means are provided on respectively opposite sides of said film transport path, and wherein said lens element is movable to bring a portion of said film support surface in said path selectively into a position for cleaning by one of said cleaning means.

3. An apparatus as claimed in claim 1, wherein said cleaning means includes a wiper element movable transversely with respect to the direction of movement of said film support element between its first and second positions and adapted to wipe across a said portion of the film support surface which has been moved out of said film transport path and to remove debris from said surface portion.

4. An apparatus as claimed in claim 1, wherein said cleaning means comprises a roller having a surface disposed in contact with said film support surface externally of but adjacent to said film transport path, said roller being rotatable about an axis generally normal to the direction of movement of the lens element between its said first and second positions, and said roller surface being adapted to remove debris from said film support surface upon movement of said lens element to bring said portion of the film support surface to said position adjacent to and clear of said path.

5. An apparatus as claimed in claim 4, wherein said roller surface has the characteristic of causing debris from said film support surface to adhere to said roller surface, and wherein the roller rotates about its said axis as a result of the friction between it and said lens element.

6. An apparatus as claimed in claim 4, wherein said lens element is a field flattener and wherein said film support surface is cylindrically curved about an axis corresponding to the axis of curvature of the film at the position of said aperture, and wherein said roller is generally barrel-shaped and has a profile corresponding generally to the curvature of said film support element.

7. An apparatus as claimed in claim 1, wherein said cleaning means comprising a cleaning disc disposed in a plane inclined at a relatively shallow angle with respect to a said portion of the film support surface which has been moved out of said film transport path, a marginal portion of said disc being disposed in contact with said film support surface and being adapted to remove debris therefrom; and drive means coupled to said disc and adapted to rotate the disc and bring successive marginal areas of the disc into contact with said film support surface for removing debris therefrom.

8. An apparatus as claimed in claim 1, further comprising suction means disposed adjacent said cleaning means and adapted to remove and convey debris away from said film transport path.

9. A projector, camera or like apparatus having a rolling loop film transport mechanism;

wherein the improvement comprises a lens element having a film support surface across which successive portions of a film can be laid during transportation of said film in a film transport path including said aperture, and means coupled to said element and adapted to vibrate the element generally in a direction which is generally parallel to a plane in which the film is disposed at said aperture.

10. An apparatus as claimed in claim 9, wherein said direction of vibration is inclined at a small angle to said film plane.

11. An apparatus as claimed in claim 10, wherein said angle is in the range 10° to 20°.

12. An apparatus as claimed in claim 9, wherein the frequency of said vibration is in the range 500 to 20,000 Hz.

13. An apparatus as claimed in claim 9, wherein the amplitude of vibration of the lens element is less than ten thousandths of an inch.

* * * * *